(12) United States Patent
Gessaman

(10) Patent No.: US 8,038,121 B2
(45) Date of Patent: Oct. 18, 2011

(54) FLUID CONTROL VALVE WITH SENSING PORT

(75) Inventor: Jeff A. Gessaman, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 397 days.

(21) Appl. No.: 12/349,345

(22) Filed: Jan. 6, 2009

(65) Prior Publication Data

US 2010/0170583 A1  Jul. 8, 2010

(51) Int. Cl.
*F16K 1/54* (2006.01)

(52) U.S. Cl. ......... 251/122; 251/205; 251/282; 251/325

(58) Field of Classification Search ............ 251/121, 251/122, 205, 282, 325
See application file for complete search history.

(56) References Cited

U.S. PATENT DOCUMENTS

| | | | | |
|---|---|---|---|---|
| 2,370,371 A * | 2/1945 | Pratt et al. | ................ | 137/315.27 |
| 3,085,590 A * | 4/1963 | McIlhenny | ................ | 137/501 |
| 3,298,389 A * | 1/1967 | Freeman | ................ | 137/454.6 |
| 3,550,617 A * | 12/1970 | Johnson | ................ | 137/514.5 |
| 4,015,631 A * | 4/1977 | Hayes | ................ | 137/625.33 |
| 4,075,296 A * | 2/1978 | Orsini et al. | ................ | 261/41.5 |
| 4,269,387 A * | 5/1981 | Reynolds et al. | ................ | 251/122 |
| 4,596,271 A | 6/1986 | Brundage | | |
| 4,793,589 A * | 12/1988 | Eldredge et al. | ................ | 251/30.03 |
| 5,544,856 A * | 8/1996 | King et al. | ................ | 251/129.08 |
| 6,725,876 B2 | 4/2004 | Bowman et al. | | |
| 6,935,616 B2 * | 8/2005 | Baumann | ................ | 251/282 |
| 7,000,895 B2 | 2/2006 | Gessaman | | |
| 7,044,434 B2 | 5/2006 | Brinks et al. | | |
| 2003/0070711 A1 | 4/2003 | Bowman et al. | | |
| 2004/0099832 A1 | 5/2004 | Gessaman | | |
| 2007/0266983 A1 | 11/2007 | Thomas et al. | | |

FOREIGN PATENT DOCUMENTS

WO  WO 03/087644 A1  10/2003

\* cited by examiner

*Primary Examiner* — John Bastianelli
(74) *Attorney, Agent, or Firm* — Reinhart Boerner Van Deuren P.C.

(57) ABSTRACT

A fluid control valve includes a valve housing having an inlet and an outlet. A metering plug is located within the valve housing, and is configured to move linearly within the valve housing along a valve axis between an open position to allow fluid flow between the inlet and the outlet, and a closed position to block fluid flow between the inlet and the outlet. A reference plane is oriented perpendicular to the valve axis. The metering plug includes a nose portion having a sensing port in fluid communication with fluid flow at the outlet. The sensing port is oriented perpendicular to the valve axis and generally parallel to the reference plane.

16 Claims, 2 Drawing Sheets

FLUID CONTROL VALVE WITH SENSING PORT

FIELD OF THE INVENTION

This invention generally relates to fluid control valves and, more particularly, to a fluid control valve configured to reduce actuation forces.

BACKGROUND OF THE INVENTION

A plug valve, particularly a contoured plug valve, may require a high actuation force to move the valve because of the fluid pressure acting on an end face of the valve. It is known that high actuation forces may lower the dynamic response of the valve. Therefore, the plug valve may include a passageway that is drilled from the nose of the valve to an internal cavity of the valve. Pressure in this internal cavity generates a pressure force on a shoulder of the valve that urges the valve in one direction and, therefore, counteracts the force of the fluid acting on the end face of the valve, which tends to urge the valve in an opposite direction.

By reducing the actuation force, a valve used in high performance applications such as, for example, a valve used for turbine fuel metering, may be actuated with a relatively inexpensive, fast acting electric actuator having a high dynamic response.

BRIEF SUMMARY OF THE INVENTION

In one embodiment, a fluid control valve includes a valve housing having an inlet and an outlet. A metering plug is located within the valve housing. The metering plug is configured to move linearly within the valve housing along a valve axis between an open position to allow fluid flow between the inlet and the outlet, and a closed position to block fluid flow between the inlet and the outlet. A reference plane is oriented perpendicular to the valve axis. The metering plug includes a nose portion located at a first end of the metering plug near the outlet, and a sensing port located at the nose portion. The sensing port, which is in fluid communication with fluid flow at the outlet, is oriented perpendicular to the valve axis and generally parallel to the reference plane.

In another embodiment, a fluid control valve includes a valve housing having an inlet and an outlet. A metering plug is located within the valve housing. The metering plug is configured to move linearly within the valve housing along a valve axis between an open position to allow fluid flow between the inlet and the outlet, and a closed position to block fluid flow between the inlet and the outlet. A reference plane is oriented perpendicular to the valve axis. The metering plug includes a nose portion located at a first end of the metering plug near the outlet, and a sensing port located at the nose portion. The sensing port, which is in fluid communication with fluid flow at the outlet, is oriented at an angle relative to the reference plane.

In yet another embodiment, a fluid control valve includes a valve housing having an inlet and an outlet. A metering plug is located within the valve housing. The metering plug is configured to move linearly within the valve housing along a valve axis between an open position to allow fluid flow between the inlet and the outlet, and a closed position to block fluid flow between the inlet and the outlet. A reference plane is oriented perpendicular to the valve axis. The metering plug includes a first end, a second end that is located opposite to the first end, and a nose portion located at the first end of the metering plug near the outlet. A conical body of the metering plug extends from the first end to the second end and tapers at the nose portion to form a tapered neck portion. The metering plug further includes a lip portion that extends from the tapered neck portion, and a sensing port that is located at the nose portion. A lip diameter of the lip portion is wider than a neck diameter of the tapered neck portion. The sensing port, which is in fluid communication with fluid flow at the outlet, is oriented at an angle relative to the reference plane.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
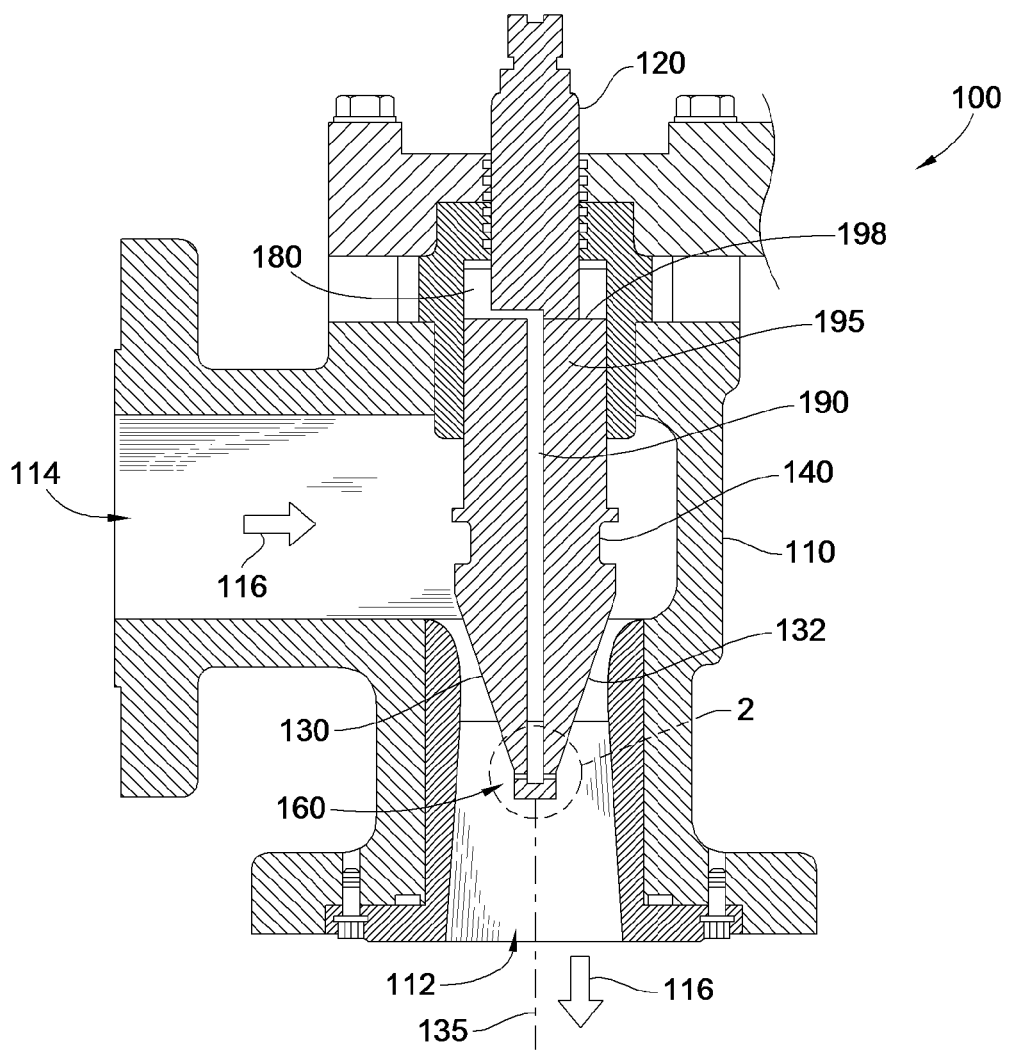
FIG. 1 is a cross-sectional view of one embodiment of a fluid control valve, including a nose portion of the fluid control valve.
Figure 2:
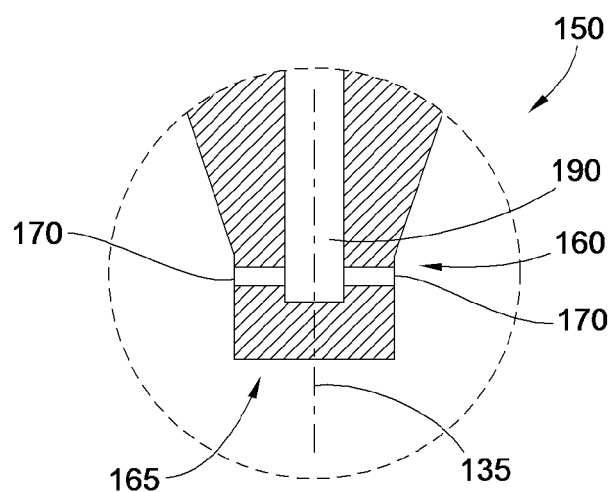
FIG. 2 is an enlarged cross-sectional view of the nose portion of FIG. 1.

Referring to FIGS. 1 and 2, a fluid control valve 100 is shown. The fluid control valve 100 is configured to control the flow of fluid (e.g., gas and/or fuel) to an industrial gas turbine or other continuous combustion system. The fluid control valve 100 includes a valve housing 110 having a fluid outlet 112 and a fluid inlet 114. The fluid inlet 114 is in communication with a source of fluid (not shown) under high pressure. As will be described in greater detail below, fluid is allowed to flow between the fluid inlet 114 and the fluid outlet 112, typically in a direction indicated generally by arrows 116, when the fluid control valve 100 is in an open position.

The fluid control valve 100 also includes a piston member 195, and a metering plug 130 operably coupled to the piston member 195. Both the piston member 195 and the metering plug 130 are located within the valve housing 110. In one embodiment, the piston member 195 and the metering plug 130 are constructed as separate component parts that are secured together. For example, the metering plug 130 may include a threaded aperture (not shown) at one end for receiving an end of the piston member 195. Alternatively, the piston member 195 may include a threaded aperture at one end for receiving an end of the metering plug 130. It is to be understood, however, that the piston member 195 and the metering plug 130 may be constructed as a unitary component, if desired.

As shown, the piston member 195 has a generally cylindrical configuration in one embodiment and extends axially from the metering plug 130. The piston member 195 is actuated by a suitable actuator (not shown) to regulate fluid flow through the fluid control valve 100 by causing the metering plug 130 to move between an open position and a closed position. Upon actuation, the piston member 195 and the metering plug 130 coupled thereto are configured to move linearly in a particular direction (e.g., a vertical direction) about a valve axis 135. A reference plane (not shown) is oriented perpendicular to the valve axis 135.

A stem member 120 of piston member 195 is mounted for linear reciprocation to move the metering plug 130 between the open position and the closed position. When the metering plug 130 is in the open position, fluid is allowed to flow between the fluid inlet 114 and the fluid outlet 112, typically in the direction indicated generally by arrows 116. On the other hand, fluid flow between the fluid inlet 114 and the fluid outlet 112 is blocked when the metering plug 130 is in the closed position.

The metering plug 130 has a generally cylindrical configuration in one embodiment, and may include a plurality of sections or portions of different diameters along an axial length of the metering plug 130. In one embodiment, the metering plug 130 includes a stem portion 140 located at one end of the metering plug 130 near the fluid inlet 114, and a nose portion 150 located at an opposite end of the metering plug 130 near the fluid outlet 112. The piston member 195 is coupled to the stem portion 140 of the metering plug 130. The stem portion 140 may include one or more stepped portions having diameters that are reduced relative to the overall diameter of the piston member 195. In addition, the metering plug 130 includes a contoured surface 132 that is shaped to provide linear gas flow versus stroke or position of the piston member 195 at substantially constant pressure.

The nose portion 150 includes a cone-shaped configuration having sides that extend radially and taper to form a tapered neck portion 160. The nose portion 150 further includes a sensing port 170 that is in fluid communication with fluid flow at the fluid outlet 112. In one embodiment, the sensing port 170 includes a plurality of sensing ports 170 located at one or both sides of the tapered neck portion 160. Furthermore, the plurality of sensing ports 170 may be disposed at various locations along the valve axis 135 of the metering plug 130 to tailor the manner in which the dynamic pressure of the fluid flow is captured at different valve strokes and pressure ratios.

The fluid control valve 100 also includes an internal chamber 180 located within the valve housing 110, and a flow passageway 190 oriented generally parallel to the valve axis 135 and extending through the metering plug 130 from the nose portion 150 to the internal chamber 180. The flow passageway 190 is configured to communicate fluid flow from the sensing port 170 at the fluid outlet 112 to the internal chamber 180. As a result, a chamber pressure of the fluid within the internal chamber 180 urges the metering plug 130 in a first direction (e.g., a downward direction) to at least partially counteract or counterbalance a fluid pressure of the fluid flow at the nose portion 150, which urges the metering plug in a second direction (e.g., an upward direction). As a result, a force of the chamber pressure acts on a shoulder 198 of the piston member 195 to urge the metering plug 130 toward the closed position. This chamber pressure force at the shoulder 198 of the piston member 195 is a fraction of the force of the fluid pressure acting on the nose portion 150 that urges the metering plug 130 toward the open position. As a result, the fluid control valve 100 is partially-balanced, particularly for large valve openings with low valve outlet pressures.

The actuation force required to move the fluid control valve 100 between the open position and the closed position may be reduced by capturing the dynamic pressure of the fluid flow at the nose portion 150. In the embodiment of FIGS. 1 and 2, the sensing port 170 is oriented in the direction of fluid flow at the fluid outlet 112. Specifically, a longitudinal axis of the sensing port 170 is oriented perpendicular to the valve axis 135 and generally parallel to the reference plane (not shown). By orienting the sensing port 170 into the direction of fluid flow, the chamber pressure acting on the shoulder 198 of the metering plug 130 may be increased as a function of the velocity of fluid flow at the nose portion 150 of the metering plug 130.

Figure 3:
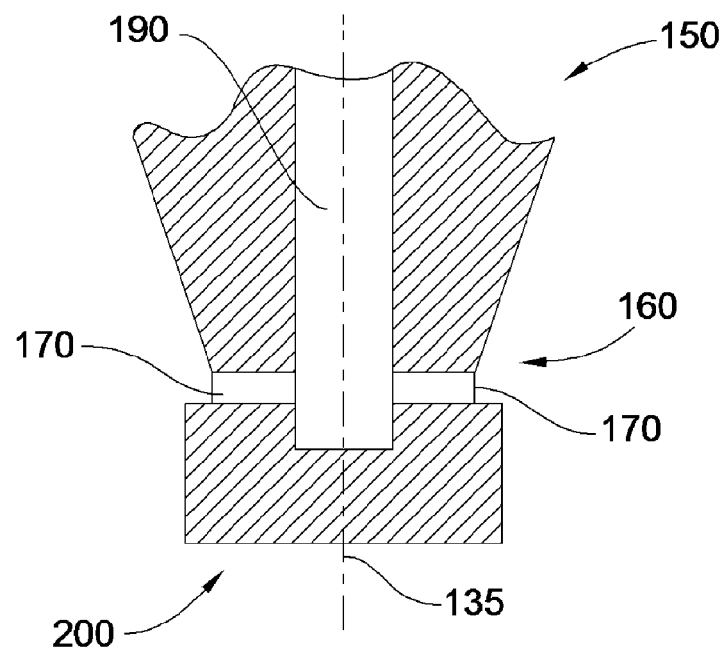
FIG. 3 is an enlarged cross-sectional view of another embodiment of the nose portion, including a tapered neck portion and a lip portion, wherein a lip diameter of the lip portion is wider than a neck diameter of the tapered neck portion.

FIG. 3 illustrates another embodiment of the nose portion 150 of the fluid control valve 100. In the embodiment of FIG. 3, the nose portion 150 includes a lip portion 200 that extends from the tapered neck portion 160. As shown, a lip diameter of the lip portion 200 is wider than a neck diameter of the tapered neck portion 160. The wider lip diameter of the lip portion 200 allows more dynamic pressure of the fluid flow at the nose portion 150 to be communicated to the internal chamber 180 through the flow passageway 190. As a result, the actuation force to move the metering plug 130 between the open position and the closed position is reduced by a greater amount than the nose portion 150 of the fluid control valve 100 shown in the embodiment of FIGS. 1 and 2 in which a lip portion 165 has a lip diameter that is substantially equal to the neck diameter of the tapered neck portion 160.

Figure 4:
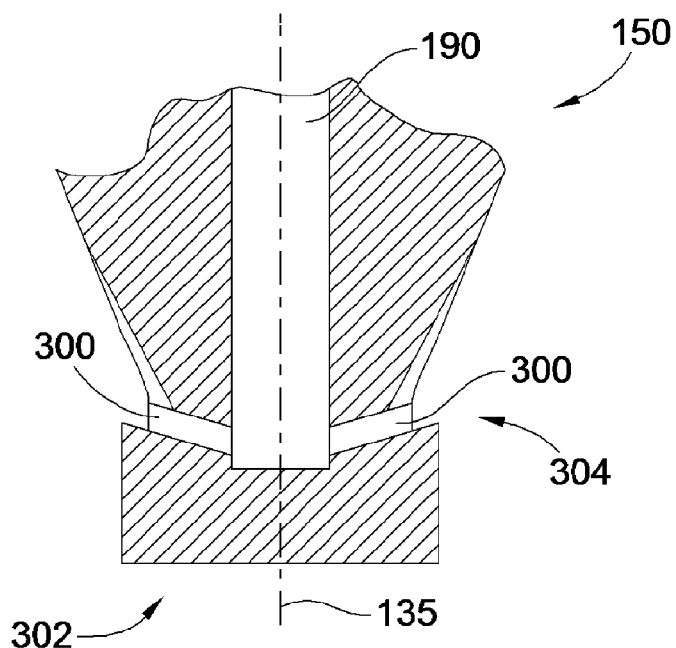
FIG. 4 is an enlarged cross-sectional view of yet another embodiment of the nose portion, including a sensing port that is angled relative to a reference plane.

FIG. 4 illustrates yet another embodiment of the nose portion 150 of the fluid control valve 100. As shown in the embodiment of FIG. 4, a longitudinal axis of the sensing port 300 may be oriented at an angle relative to the reference plane. Like the nose portion 150 of the fluid control valve 100 shown in the embodiment of FIG. 3, a lip diameter of the lip portion 302 is wider than a neck diameter of the tapered neck portion 304 in the embodiment of the fluid control valve 100 shown in FIG. 4. As a result of the angled geometry of the sensing port 300, more dynamic pressure of the fluid flow at the nose portion 150 may be communicated to the internal chamber 180 through the flow passageway 190, thereby reducing the actuation force to move the metering plug 130 between the open position and the closed position.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context

What is claimed is:

1. A fluid control valve, comprising:
a valve housing comprising an inlet and an outlet; and
a metering plug located within the valve housing, wherein the metering plug is configured to move linearly within the valve housing along a valve axis between an open position to allow fluid flow between the inlet and the outlet, and a closed position to block fluid flow between the inlet and the outlet, wherein a reference plane is oriented perpendicular to the valve axis, and wherein the metering plug comprises:
a nose portion located at a first end of the metering plug near the outlet, and
a sensing port located at the nose portion, in the outlet, downstream from any sealing contact between the metering plug and the valve housing, wherein the sensing port is in fluid communication with fluid flow at the outlet whether the metering plug is in the open or closed position, and wherein the sensing port is oriented perpendicular to the valve axis and generally parallel to the reference plane.

2. The fluid control valve of claim 1, further comprising:
an internal chamber located within the valve housing; and
a passageway oriented generally parallel to the valve axis and extending through the metering plug from the nose portion to the internal chamber, wherein the passageway is configured to communicate fluid flow from the sensing port to the internal chamber, and wherein a chamber pressure of fluid at the internal chamber counteracts a fluid pressure of fluid at the nose portion.

3. The fluid control valve of claim 1, wherein the metering plug further comprises a conical body which extends from the first end of the metering plug to a second end of the metering plug that is located opposite the first end, and wherein the conical body tapers at the nose portion to form a tapered neck portion.

4. The fluid control valve of claim 3, further comprising a piston member located within the valve housing and operably coupled to the metering plug at the second end, wherein the piston member is configured to move the metering plug between the open position and the closed position.

5. The fluid control valve of claim 3, wherein the sensing port comprises a plurality of sensing ports located radially around the tapered neck portion.

6. The fluid control valve of claim 3, wherein the metering plug comprises a lip portion extending from the tapered neck portion at the first end of the metering plug.

7. A fluid control valve, comprising:
a valve housing comprising an inlet and an outlet; and
a metering plug located within the valve housing, wherein the metering plug is configured to move linearly within the valve housing along a valve axis between an open position to allow fluid flow between the inlet and the outlet, and a closed position to block fluid flow between the inlet and the outlet, wherein a reference plane is oriented perpendicular to the valve axis, and wherein the metering plug comprises:
a nose portion located at a first end of the metering plug near the outlet, and
a sensing port located at the nose portion, in the outlet, downstream from any sealing contact between the metering plug and the valve housing, wherein the sensing port is in fluid communication with fluid flow at the outlet, and wherein the sensing port is oriented perpendicular to the valve axis and generally parallel to the reference plane;
wherein the metering plug further comprises a conical body which extends from the first end of the metering plug to a second end of the metering plug that is located opposite the first end, and wherein the conical body tapers at the nose portion to form a tapered neck portion; and
wherein the metering plug comprises a lip portion extending from the tapered neck portion at the first end of the metering plug; and
wherein the metering plug comprises a generally cylindrical configuration, and wherein a lip diameter of the lip portion is wider than a neck diameter of the tapered neck portion.

8. A fluid control valve, comprising:
a valve housing comprising an inlet and an outlet; and
a metering plug located within the valve housing, wherein the metering plug is configured to move linearly within the valve housing along a valve axis between an open position to allow fluid flow between the inlet and the outlet, and a closed position to block fluid flow between the inlet and the outlet, wherein a reference plane is oriented perpendicular to the valve axis, and wherein the metering plug comprises:
a nose portion located at a first end of the metering plug near the outlet, and
a sensing port located at the nose portion, in the outlet, downstream from any sealing contact between the metering plug and the valve housing, wherein the sensing port is in fluid communication with fluid flow at the outlet whether the metering plug is in the open or closed position, and wherein the sensing port is oriented at an angle relative to the reference plane.

9. The fluid control valve of claim 8, further comprising:
an internal chamber located within the valve housing; and
a passageway oriented generally parallel to the valve axis and extending through the metering plug from the nose portion to the internal chamber, wherein the passageway is configured to communicate fluid flow from the sensing port to the internal chamber, and wherein a chamber pressure of fluid at the internal chamber counteracts a fluid pressure of fluid at the nose portion.

10. The fluid control valve of claim 8, wherein the metering plug further comprises a conical body which extends from the first end of the metering plug to a second end of the metering plug that is located opposite the first end, and wherein the conical body tapers at the nose portion to form a tapered neck portion.

11. The fluid control valve of claim 10, wherein the sensing port comprises a plurality of sensing ports located radially around the tapered neck portion.

12. The fluid control valve of claim 10, further comprising a piston member located within the valve housing and operably coupled to the metering plug at the second end, wherein the piston member is configured to move the metering plug between the open position and the closed position.

13. A fluid control valve, comprising:
   a valve housing comprising an inlet and an outlet; and
   a metering plug located within the valve housing, wherein the metering plug is configured to move linearly within the valve housing along a valve axis between an open position to allow fluid flow between the inlet and the outlet, and a closed position to block fluid flow between the inlet and the outlet, wherein a reference plane is oriented perpendicular to the valve axis, and wherein the metering plug comprises:
      a first end and a second end that is located opposite the first end;
      a nose portion located at the first end of the metering plug near the outlet;
      a conical body which extends from the first end of the metering plug to the second end of the metering plug, wherein the conical body tapers at the nose portion to form a tapered neck portion;
      a lip portion that extends from the tapered neck portion, wherein a lip diameter of the lip portion is wider than a neck diameter of the tapered neck portion; and
      a sensing port located at the nose portion, in the outlet, downstream from any sealing contact between the metering plug and the valve housing, wherein the sensing port is in fluid communication with fluid flow at the outlet, and wherein the sensing port is oriented at an angle relative to the reference plane.

14. The fluid control valve of claim 13, further comprising:
   an internal chamber located within the valve housing; and
   a passageway oriented generally parallel to the valve axis and extending through the metering plug from the nose portion to the internal chamber, wherein the passageway is configured to communicate fluid flow from the sensing port to the internal chamber, and wherein a chamber pressure of fluid at the internal chamber counteracts a fluid pressure of fluid at the nose portion.

15. The fluid control valve of claim 13, wherein the sensing port comprises a plurality of sensing ports located radially around the tapered neck portion.

16. The fluid control valve of claim 13, further comprising a piston member located within the valve housing and operably coupled to the metering plug at the second end, wherein the piston member is configured to move the metering plug between the open position and the closed position.

* * * * *